(12) United States Patent
Cantagrel

(10) Patent No.: US 6,765,777 B2
(45) Date of Patent: Jul. 20, 2004

(54) OVERVOLTAGE-PROTECTION DEVICE

(75) Inventor: Michel Cantagrel, Houilles (FR)

(73) Assignee: CITEL, Issy-Es-Moulineaux (FR)

( * ) Notice: Subject to any disclaimer, the term of this patent is extended or adjusted under 35 U.S.C. 154(b) by 0 days.

(21) Appl. No.: 09/939,628

(22) Filed: Aug. 28, 2001

(65) Prior Publication Data

US 2002/0024792 A1 Feb. 28, 2002

(30) Foreign Application Priority Data

Aug. 29, 2000 (FR) .............................. 00 11015

(51) Int. Cl.[7] .............................................. H02H 1/00
(52) U.S. Cl. ...................................... 361/103; 361/120
(58) Field of Search .............................. 361/56, 91, 117, 361/118, 120, 124, 125, 126, 127, 111

(56) References Cited

U.S. PATENT DOCUMENTS

| | | | | |
|---|---|---|---|---|
| 4,232,351 A | * | 11/1980 | Baker | 361/56 |
| 4,491,723 A | * | 1/1985 | Cole | 219/505 |
| 4,571,656 A | * | 2/1986 | Ruckman | 361/56 |
| 4,587,588 A | * | 5/1986 | Goldstein | 361/54 |
| 4,677,518 A | * | 6/1987 | Hershfield | 361/56 |
| 5,299,088 A | * | 3/1994 | Honl et al. | 361/119 |
| 5,379,176 A | * | 1/1995 | Bacon et al. | 361/106 |
| 5,412,526 A | * | 5/1995 | Kapp et al. | 361/56 |
| 5,414,587 A | * | 5/1995 | Kiser et al. | 361/118 |
| 5,914,662 A | * | 6/1999 | Burleigh | 340/635 |
| 6,282,075 B1 | * | 8/2001 | Chaudhry | 361/111 |
| 6,683,770 B1 | * | 1/2004 | Marsh | 361/111 |

FOREIGN PATENT DOCUMENTS

| | | |
|---|---|---|
| DE | 31 11 096 A1 | 9/1982 |
| DE | 38 34 514 A1 | 4/1990 |
| EP | 0 895 332 A1 | 2/1999 |

* cited by examiner

*Primary Examiner*—Stephen W. Jackson
*Assistant Examiner*—Danny Nguyen
(74) *Attorney, Agent, or Firm*—Connolly Bove Lodge & Hutz LLP; Larry J. Hume, Esq.

(57) ABSTRACT

Overvoltage-protection device, applicable in particular to the low-voltage mains, comprising, between the two lines (1, 2) of the mains, a gas-discharge arrestor (3), a varistor (4) and a thermal-fuse element (5) task with ensuring the thermal disconnection of the device. It includes, in parallel with the varistor (4), a resistor (7) causing, after the short-circuiting of the gas-discharge arrestor (3), the heating of the thermal-fuse element (5) so as to trigger the thermal disconnection of the device.

2 Claims, 1 Drawing Sheet

OVERVOLTAGE-PROTECTION DEVICE

BACKGROUND OF THE INVENTION

1. Field of the Invention

The invention relates to an overvoltage-protection device, applicable in particular to the low-voltage mains.

2. Description of Related Art

For the protection of a consumer circuit supplied from the low-voltage mains (below 400 V, for example), it is usual to use, between the two lines of a 50 or 60 Hz AC mains, a varistor of metal-oxide type, especially of zinc-oxide type, mounted in series, on the one hand, with a thermal-fuse circuit-breaking element, and, on the other hand, with a gas-discharge arrestor. FIG. 1 represents a diagram representative of such a device. Between the lines 1 and 2 of the mains, the right-hand part of which is to be protected against overvoltages, are mounted in series a discharge arrestor 3, a varistor 4 and a thermal-fuse element 5 subjected to the tension from a spring 6 tasked with ensuring effective disconnection after the element 5 blows.

Such a device theoretically operates in the following way: the gas-discharge arrestor 3 withstands practically the entire AC voltage of the mains. In effect, the stray capacitance of the arrestor 3 is of a few picofarads whereas the stray capacitance of the varistor 4 is of a few nanofarads. When an overvoltage occurs, it causes the striking of the gas-discharge arrestor 3, which can only be extinguished if the current, called secondary current, which passes through it subsequently becomes sufficiently small. It is the resistance of the varistor 4 which causes the limiting of the secondary current and allows the gas-discharge arrestor 3 to be extinguished.

When an overvoltage-protection device has operated a certain number of times, its components reach the end of their lives. In the case of a gas-discharge arrestor, the end of life corresponds to short-circuiting. In contrast, in the case of a varistor, the end of life is manifest as an explosion.

As a safety measure, the gas-discharge arrestor is designed so that its ability to carry away the energy pulses relating to the overvoltages is less than that of the varistor. In this way, it is the gas-discharge arrestor which arrives first at the end of its life and which becomes short-circuited.

The voltage of the mains is then transferred fully onto the varistor 4, which heats up and entails the blowing of the thermal-fuse element 5 and the thermal disconnection, that is to say the placing out of service, of the protection device.

Such a device operates satisfactorily, but only within a limited range of voltages. This is because, in order for the varistor effectively to ensure the extinction of the gas-discharge arrestor, its rated voltage has to be very close to that of the mains. Moreover, if the rated voltage of the varistor is too high, the heating necessary to trigger the thermal disconnection will not be reached and the safety of operation of the device will not be ensured.

SUMMARY OF THE INVENTION

The object of the invention is to propose an overvoltage-safety device which can operate in a wide range of voltages, for example between 180 and 330 V, in order to be able to fulfill its role in practically all the countries of the world.

Another object of the invention is to propose an overvoltage-safety device in which the function of extinguishing the gas-discharge arrestor is dissociated from the thermal-disconnection function.

The subject of the invention is an overvoltage-protection device, applicable in particular to the low-voltage mains, comprising, between the two lines of the mains, a gas-discharge arrestor, a varistor and a thermal-fuse element tasked with ensuring the thermal disconnection of the device, characterized in that it includes, in parallel with the varistor, a resistor causing, after the short-circuiting of the gas-discharge arrestor, the heating of the thermal-fuse element so as to trigger the thermal disconnection of the device.

Advantageously, the overvoltage-protection device is applicable to the low-voltage mains in a wide range of voltages. The varistor is defined so as to extinguish the gas-discharge arrestor up to the maximum voltage of use, and the resistor is defined so as to trigger the thermal disconnection of the device at the minimum voltage of use.

BRIEF DESCRIPTION OF THE DRAWINGS

Other characteristics of the invention emerge from the description which follows, given with reference to the attached drawing, in which.

DESCRIPTION OF PREFERRED EMBODIMENTS OF THE INVENTION

Figure 2:
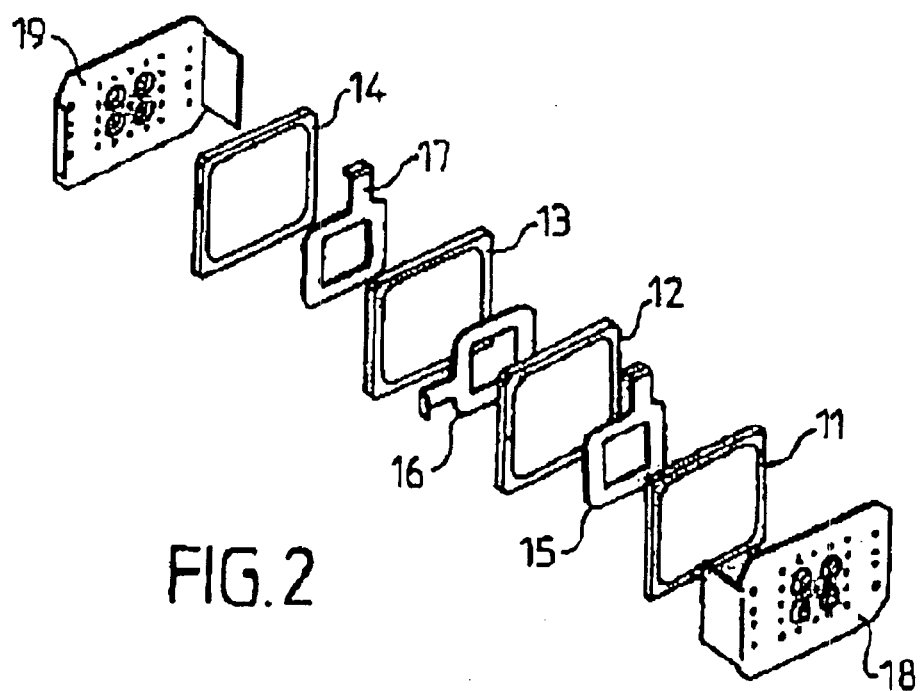
FIG. 2 is an exploded view of an embodiment of a group of varistors mounted in parallel.

FIG. 2 represents an assembly of four varistors 11, 12, 13, 14 mounted in parallel, separated by electrodes 15, 16, 17 and held between two strips 18 and 19. Advantageously, the gas-discharge arrestor is mounted on one of the two strips, and the thermal-fuse element is mounted on the other.

Figure 1:
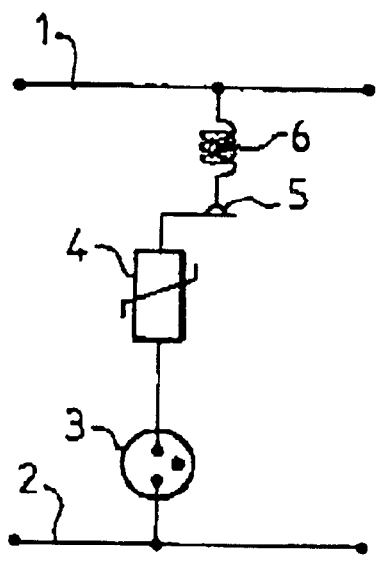
FIG. 1 is a diagram representative of an example embodiment of an overvoltage-protection device of known type.
Figure 3:
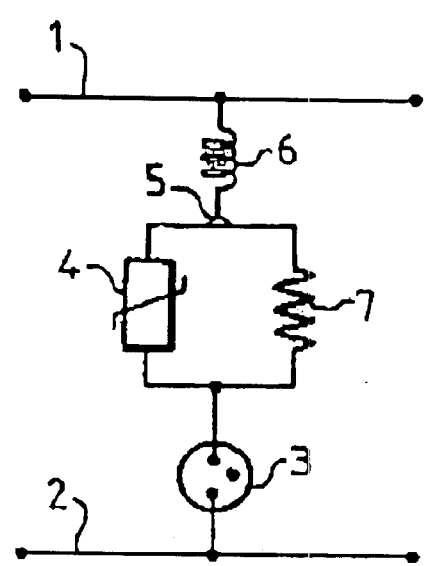
FIG. 3 is a diagram representative of an example embodiment of an overvoltage-protection device according to the invention.

In FIG. 3, the same elements as in FIG. 1 bear the same references. According to the invention, a resistor 7 is mounted in parallel with the varistor 4. This resistor has a value of a few hundred ohms, for example 400 ohms.

In the case in which the varistor 4 consists of an assembly of several varistors in parallel, as in FIG. 2, one of the varistors (11) can be replaced by a resistor 7 of the same dimensions. This resistor 7 may be fixed, or have a negative or positive temperature coefficient. Its purpose is to cause the heating which will trigger the thermal disconnection by way of the thermal—fuse element 5, so as to put the device out of service after the end of its life, that is to say the short-circuiting of the gas-discharge arrestor 3.

Thus, in an intended range of operating 5 voltages between 180 and 330 V, for example, the varistors will be defined so as to extinguish the gas-discharge arrestor up to the maximum voltage of use (330 V), while the resistor will be defined so as to be able to trigger the thermal disconnection at the minimum voltage of the operating range (180 V).

The arranging of the resistor 7 in parallel with the varistor 4 makes it possible to separate the two functions: extinguishing of the gas-discharge arrestor, and triggering of the thermal disconnection.

Throughout the description, the expression gas-discharge arrestor has been used. This expression also covers the notion of air-gap arrestor, of surge arrestor or of lightning arrestor.

What is claimed is:

1. An over-voltage protection device suitable for protecting an electrical supply the device comprising:

a gas-discharge arrestor;

a varistor and a thermal-fuse element arranged to ensure a thermal disconnection of the over-voltage protection device from the electrical supply, said gas-discharge arrestor, said varistor, and said thermal-fuse element being mounted in series with each other between two lines of the electrical supply, wherein the over-voltage protection device includes, in parallel with the varistor, a resistor sized so as to cause, after a short-circuiting of the gas-discharge arrestor, a heating of the thermal-fuse element which triggers the thermal disconnection of the over-voltage protection device from the electrical supply.

2. The over-voltage protection device according to claim 1, wherein said electrical supply is a low-voltage electrical supply having a voltage of use within a range of voltages bounded by a minimum voltage of use and a maximum voltage of use, wherein the varistor is sized so as to extinguish the gas-discharge arrestor up to the maximum voltage of use, wherein the resistor is sized so as to trigger the thermal disconnection of the over-voltage protection device at the minimum voltage of use.

* * * * *